United States Patent [19]
Lee

[11] Patent Number: 5,988,887
[45] Date of Patent: Nov. 23, 1999

[54] JOURNAL BEARING APPARATUS

[75] Inventor: Chang-woo Lee, Kyonggi-do, Rep. of Korea

[73] Assignee: Samsung Electronics Co., Ltd., Kyungki-do, Rep. of Korea

[21] Appl. No.: 09/173,161

[22] Filed: Oct. 15, 1998

Related U.S. Application Data

[62] Division of application No. 08/960,060, Oct. 29, 1997, Pat. No. 5,855,438.

[30] Foreign Application Priority Data

Oct. 29, 1996 [KR] Rep. of Korea ................... 96-49784
Oct. 30, 1996 [KR] Rep. of Korea ................... 96-50377

[51] Int. Cl.$^6$ ............................................... F16L 17/10
[52] U.S. Cl. ........................... 384/107; 384/111; 384/114
[58] Field of Search ............................ 384/107, 111, 384/114, 120, 112

[56] References Cited

U.S. PATENT DOCUMENTS 4,366,993  1/1983  Ono et al. .......................... 384/120
5,357,162  10/1994  Aiyoshizawa et al. ................ 384/112

Primary Examiner—Lenard A. Footland
Attorney, Agent, or Firm—Sughrue, Mion, Zinn, Macpeak & Seas, PLLC

[57] ABSTRACT

A journal bearing apparatus capable of varying the clearance between a bush which protrudes from the inner surface of a sleeve in which a rotation shaft is inserted and the outer surface of the rotation shaft, in the longitudinal direction of a first dynamic pressure generating groove. Moreover, a journal bearing apparatus is capable of varying the clearance between one end of the rotation shaft and the surface of a thrust bearing, in the diametral direction of a second dynamic pressure generating groove. The clearance becomes wider towards the central part from the ends of the bush, or towards the central part from the edge parts of the surface of the thrust bearing. The shape of the end of the bush or the thrust bearing is preferably a circular arc. Thereby, the fluid pressure on the rotation shaft which faces the first and second dynamic pressure generating grooves is uniform.

11 Claims, 3 Drawing Sheets

JOURNAL BEARING APPARATUS

This is a divisional of application Ser. No. 08/960,060 filed Oct. 29, 1997, now U.S. Pat. No. 5,855,438.

BACKGROUND OF THE INVENTION

1. Field of the Invention

The present invention relates to a journal bearing apparatus, and more particularly to a journal bearing apparatus capable of varying the clearance between a rotation shaft and a bush of a sleeve facing each other, or the clearance between an end of the rotation shaft and the surface of a thrust bearing facing each other.

2. Description of the Related Art

Recently, as computer-related industries have been developed, driving motors for various kinds of facilities, such as a head driving apparatus of a video tape recorder, an optical polygon driving apparatus of a laser printer, or a camcorder driving motor, require a high density and a miniaturized form. These driving apparatuses require a bearing which is precise and stable, and has a superhigh rotation performance. In compliance with this requirement, a journal bearing is generally used. In the journal bearings, to minimize friction which prevents the rotation of a rotation shaft, the vibration causing a low performance of the rotation shaft, and the noise of the rotation shaft, dynamic pressure generating grooves having several shapes have been developed.

Referring to FIG. 1, a scanner motor, i.e., an optical polygon driving device of a laser printer employing a conventional journal bearing, is illustrated. As shown in the drawing, a plate 60 having a rotor (not illustrated) is indentedly fixed at a hub 70, and an optical polygon 80 is mounted on the hub 70. The hub 70 is indentedly fixed at the rotation shaft 30. A sleeve 20 having a through hole therein is inserted into one side of a bearing bracket 10, fixed by screws. At the other side of the bearing bracket 10, a thrust bearing 50 is inserted and fixed to the sleeve 20 by screws.

The end of the rotation shaft 30 is inserted into the sleeve 20, and faces the thrust bearing 50. Moreover, a first dynamic pressure generating groove 35 is formed in the outer surface of the rotation shaft 30, and a bush 25 which protrudes from the inner surface of the sleeve 20 facing the first dynamic pressure generating groove 35, to support a radial load of the rotation shaft 30. On the surface of the thrust bearing 50, a second dynamic pressure generating groove 55 is formed to support a thrust load of the rotation shaft 30. Reference numeral 20a illustrates a vent hole.

The fluid pressure generated between the bush 25 and the outer surface of the rotation shaft 30 is illustrated as follows. The fluid pressure P generally formed between the bush 25 and the outer surface of the rotation shaft 30 is obtained by the following formula:

$$P = F/S$$

where, F is a weight of the rotation shaft and axial load, and S is a clearance area between the bush 25 and the rotation shaft 30. Here, assuming that F is constant, the fluid pressure P is in reverse proportion to the clearance area S.

As the clearance S between the bush 25 and the rotation shaft 30 is constant in the longitudinal direction of the first dynamic pressure generating groove 35, the fluid pressure P is always constant with respect to one side of the rotation shaft 30. However, as shown in FIG. 1, with respect to both sides, as the clearance S between the bush 25 and the rotation shaft 30 is not constant (that is, $\Delta L1 \neq \Delta L2$), the clearance area varies, and thereby a large fluid pressure is generated in the area where the clearance is narrow. To the contrary, where the clearance between the bush 25 and the rotation shaft 30 is wide, the fluid pressure is feeble.

Next, the fluid pressure generated between the end of the rotation shaft 30 and the thrust bearing 50 is explained as follows.

After the fluid flows into edge parts A and C of the second dynamic pressure generating groove 55 of the thrust bearing 50 by the rotation of the rotation shaft 30, the fluid turns and flows into a central part B of the second dynamic pressure generating groove 55, and thereby the fluid pressure P for raising the rotation shaft 30 is generated in the central part of the second dynamic pressure generating groove 55. As there is no variation in clearance area S between the thrust bearing 50 and the end of the rotation shaft 30, and in the weight of the rotation shaft and the axial load F, the fluid pressure P increases in proportion to the angular velocity. When the rotation shaft arrives at a predetermined number of rotations per minute, and the fluid pressure P is greater than weight of the rotation shaft and the axial load F, the rotation shaft 30 forms a predetermined clearance apart from the thrust bearing 50 and it is raised upwardly, thereby realizing an equilibrium state.

The time for the rotation shaft 30 to be raised is determined by both the clearance area between the thrust bearing 50 and the rotation shaft 30, and the rotational speed of the rotation shaft 30.

However, the conventional journal bearing apparatus has some problems as follows.

First, the stability of the rotation shaft is greatly declined due to the pressure variation generated between the bush and the rotation shaft. In other words, fluids are gathered at the folding part of the first dynamic pressure generating groove having a herringbone shape, generating a high fluid pressure. Due to the instability of the rotation shaft due to the concentration of the fluid pressure from the initial driving of the rotation shaft until the state of equilibrium, excessive vibration of the shaft is generated.

Furthermore, in the case that the rotation shaft stops, the center of the rotation shaft is eccentric for the center of the second dynamic pressure generating groove. When the rotation is performed under this state, as the center of the second dynamic pressure generating groove having the greatest fluid pressure and the center of the rotation shaft to be raised are incompatible with each other, the power is unbalanced and the rotation becomes unstable. Moreover, it takes a considerable period of time to square the center of the rotation shaft with the central part of the second dynamic pressure generating groove by the fluid pressure generated by the second dynamic pressure generating groove, thereby lower quality products are produced.

SUMMARY OF THE INVENTION

Therefore, it is an object of the present invention to provide a journal bearing apparatus having a variable clearance capable of evenly supporting the load of a rotation shaft over the whole area of a bush so that fluid pressure generated between the rotation shaft and the bush can be evenly distributed in the longitudinal direction of a first dynamic pressure generating groove by continuously varying the clearance between the bush inside of a sleeve and the rotation shaft.

It is another object of the present invention to provide a journal bearing apparatus capable of stably rotating the rotation shaft even though an eccentricity is generated between the center of the rotation shaft and the central part of the fluid pressure generated by a second dynamic pressure generating groove, by evenly distributing the fluid pressure concentrated in the center of the second dynamic pressure generating groove.

According to one aspect of the present invention, a journal bearing apparatus, includes: a rotation shaft having a first dynamic pressure generating groove formed at its outer surface along the circumferential direction; a sleeve having a through hole formed therein in which the rotation shaft is inserted, and a bush which protrudes from a part of the sleeve facing the first dynamic pressure generating groove of the rotation shaft; a bearing bracket for fixing the sleeve; and a thrust bearing which faces an end of the rotation shaft, and has a second dynamic pressure generating groove to generate the fluid pressure for raising the rotation shaft. The clearance between the protrusions of the bush and the first dynamic pressure generating groove varies in the longitudinal direction of the first dynamic pressure generating groove.

According to another aspect of the present invention, a journal bearing apparatus, includes: a rotation shaft having a first dynamic pressure generating groove formed at its outer surface along the circumferential direction; a sleeve having a through hole formed therein in which the rotation shaft is inserted, and a bush which protrudes from a part of the sleeve facing the first dynamic pressure generating groove of the rotation shaft; a bearing bracket for fixing the sleeve; and a thrust bearing which faces an end of the rotation shaft, and has a second dynamic pressure generating groove to generate the fluid pressure for raising the rotation shaft. The clearance between the end of the rotation shaft and the surface of the thrust bearing continuously varies in the diametral direction of the second dynamic pressure generating groove.

Preferably, the clearance becomes wider towards the central part from the ends of the bush. Or, the clearance becomes wider towards the central part from the edge parts of the surface of the thrust bearing. The end of the bush or the surface of the thrust bearing is preferably a circular arc shape. More preferably, at least one bush which protrudes from the inner surface of the sleeve.

Preferably, in the case that the rotation shaft is rotated, the curvature of the circular arc is set to have an even fluid pressure in the longitudinal direction of the first dynamic pressure generating groove or in the diametral direction of the second dynamic pressure generating groove.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The objects, characteristics and advantages of the above-described invention will be more clearly understood through the preferred embodiments referring to the attached drawings.

Figure 1:
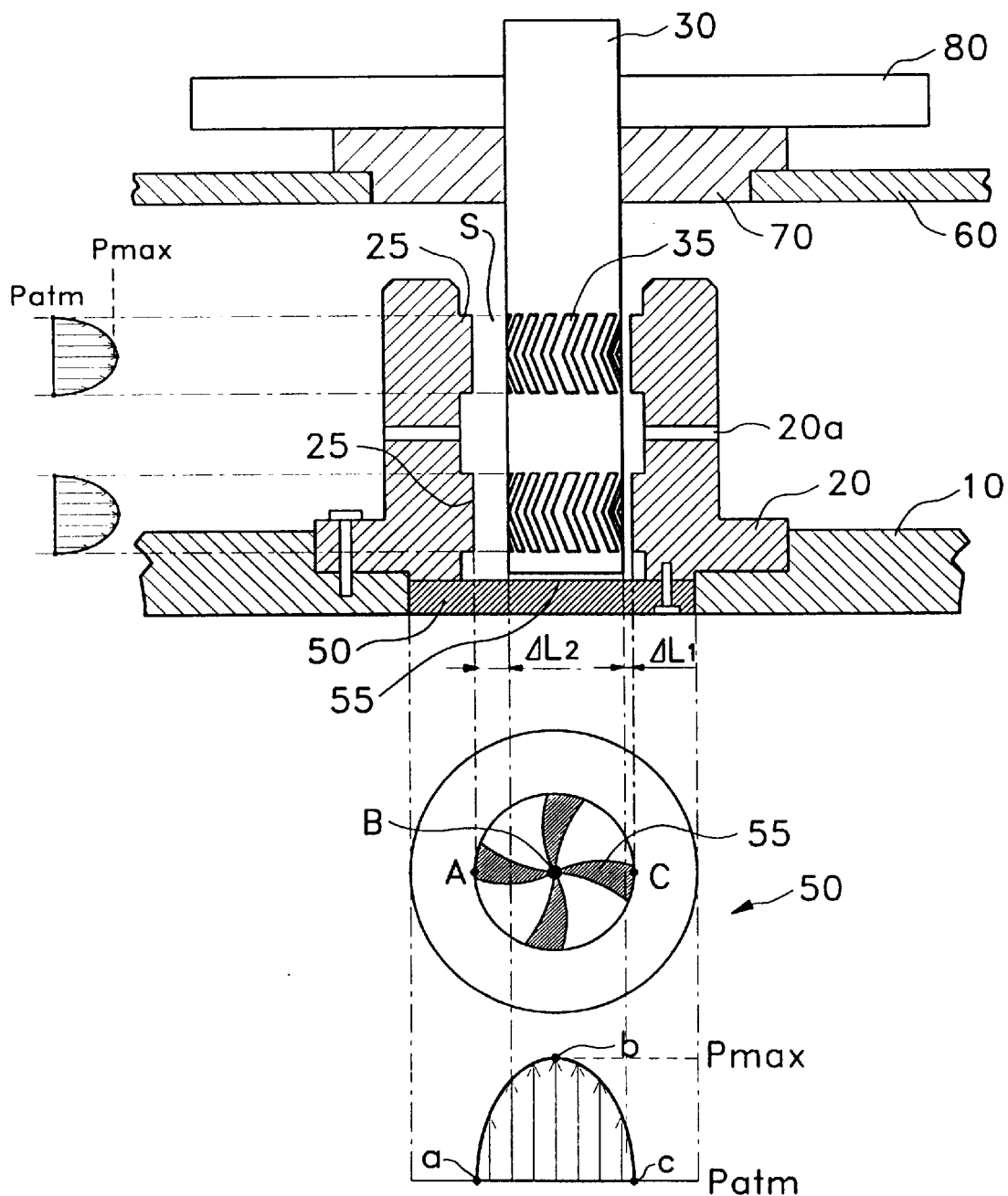
FIG. 1 is a sectional view illustrating a conventional journal bearing apparatus having first and second dynamic pressure generating grooves, and a graph indicating a distribution of fluid pressure generated from the second dynamic pressure generating groove by a rotation shaft.
Figure 2:
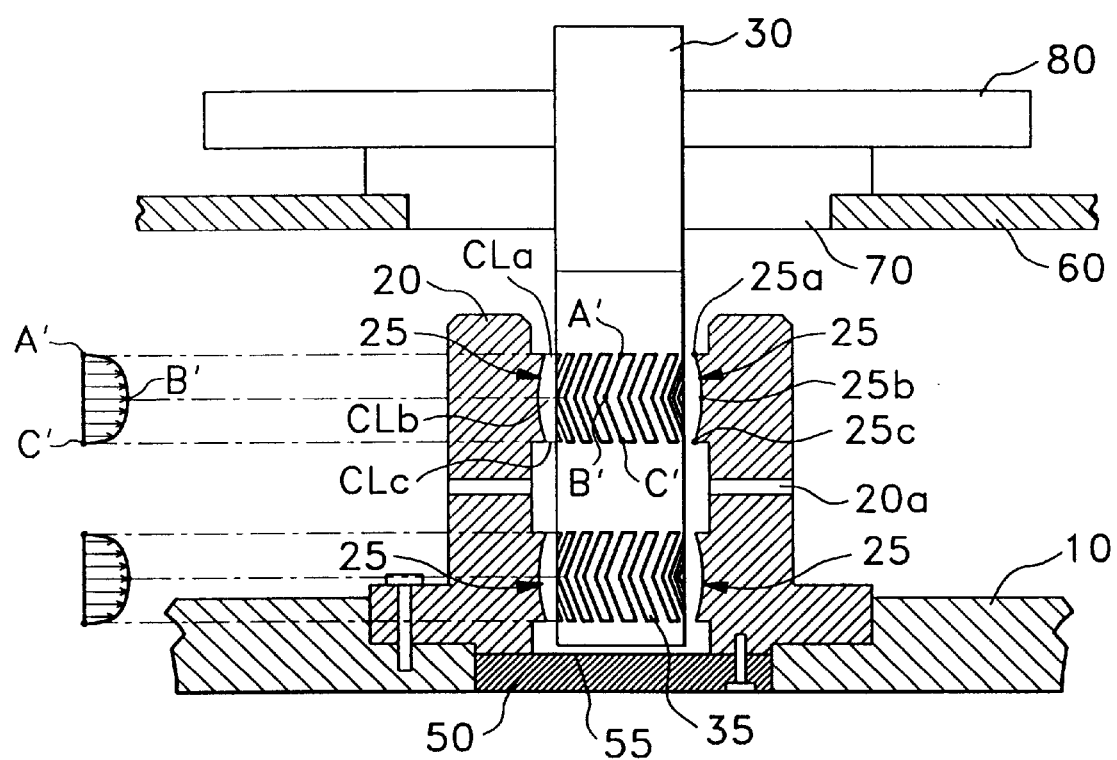
FIG. 2 is a sectional view illustrating a journal bearing apparatus and a graph indicating a distribution of fluid pressure applied to the outer surface of the rotation shaft, according to one embodiment of the present invention.

Referring to FIG. 2, a plate 60 having a rotor (not illustrated) is indentedly fixed at a hub 70, and an optical polygon 80 is mounted on the hub 70. Here, the hub 70 is indentedly fixed at the rotation shaft 30. A sleeve 20 having a through hole formed therein is inserted into one side of a bearing bracket 10, and is fixed by screws. At the other side of the bearing bracket 10, a thrust bearing 50 is inserted and is fixed at the sleeve 20 by screws. A vent hole 20a is piercingly formed at the side wall of the sleeve 20 so that the fluid flows into a first dynamic pressure generating groove 35.

The end of the rotation shaft 30 is inserted into the sleeve 20, and faces the thrust bearing 50. Moreover, the first dynamic pressure generating groove 35 is formed in the outer surface of the rotation shaft 30, and a bush 25 is protrusively formed inside of the sleeve 20 facing the first dynamic pressure generating groove 35, to support a radial load of the rotation shaft 30. On the surface of the thrust bearing 50, a second dynamic pressure generating groove 55 is formed to support a thrust load of the rotation shaft 30.

According to one embodiment of the present invention, the clearance between the rotation shaft 30 and the bush 25 of the sleeve 20 facing each other continuously varies along the longitudinal direction of the first dynamic pressure generating groove 35. The clearance is wider in the central part than in the sides parts. According to this embodiment, as the end of the bush has a circular arc shape, the aforesaid clearance continuously varies. In the case that the rotation shaft is rotated, the curvature of the circular arc is set so that the fluid pressure loaded into the longitudinal direction of the first dynamic pressure generating groove can be uniform.

The details of the first embodiment will be explained as follows.

First, edge parts of the first dynamic pressure generating groove 35 are indicated as A' and C', and a central part is indicated as B'. Parts of the bush 25 facing A', C' and B' are indicated as 25a, 25c and 25b, respectively. Moreover, clearances between A' and 25a, B' and 25b, and C' and 25c are defined as CLa, CLb and CLc, respectively. When CLa and CLc are zero (0), CLb is: 0<CLb<1-10 μm. Accordingly, the relation of the clearances CLa, CLb and CLc are: CLa, CLc<CLb<1-10 μm. Referring to FIG. 2, the bush 25 is a shape of a circular arc which passes through 25a, 25b and 25c, and the curvature of the circular arc is decided by the CLb, if Cla is equal to CLc.

The fluid pressure in the longitudinal direction of the first dynamic pressure generating groove varies gradually along the circular arc of the bush 25. The fluid pressure is large in edge parts A' and C' where the clearance area between the bush 25 and the rotation shaft 30 is small. To the contrary, in the central part B' where the clearance area is large, the fluid pressure becomes small. However, as fluids induced from A' and C' are gathered in B', it is possible to uniform the fluid pressure of each parts A', C' and B' by properly controlling the clearance area according to the curvature of the circular arc, and thereby a uniform distribution of pressure can be realized as shown in the graph of FIG. 2.

The operation of the journal bearing apparatus in which the clearance varies continuously is now explained.

First, when power is supplied to a rotor and stator (not illustrated) and the rotor starts to rotate, a plate 60 to which the rotor is attached, a hub 70 to which the plate 60 is fixed, an optical polygon 80 fixed to the hub 70, and the rotation shaft 30 to which the hub 70 is indentedly fixed are rotated at the same angular velocity.

At this time, the fluid between the bush 25 and the rotation shaft 30 is induced to a part B' of the first dynamic pressure generating groove through parts A' and C' of the first dynamic pressure generating groove. The induced fluid is gathered in C' and a predetermined fluid pressure P is generated.

The fluid pressure P is decided by the force F (kgf) which pushes the rotation shaft 30 by the weight of the rotation shaft and axial load, the clearance area S between the rotation shaft 30 and the bush 25, and the rotational speed of the rotation shaft 30. As the force F which pushes the rotation shaft 30 is already determined, the fluid pressure P is actually determined by the clearance area S and the rotational speed of the rotation shaft 30. When the rotation shaft 30 starts to drive, the clearance area between the edge parts A' and C' of the first dynamic pressure generating groove 35 and the bush 25 is the smallest, and the fluid pressure is the largest. Subsequently, as the fluid is induced from A' to B', and from C' to B', the clearance area gradually increases, and the fluid pressure P gradually decreases. In result, the fluid pressure P on the bush 25 and the rotation shaft 30 becomes even, and the stability of the rotation shaft 30 increases.

Figure 3A:
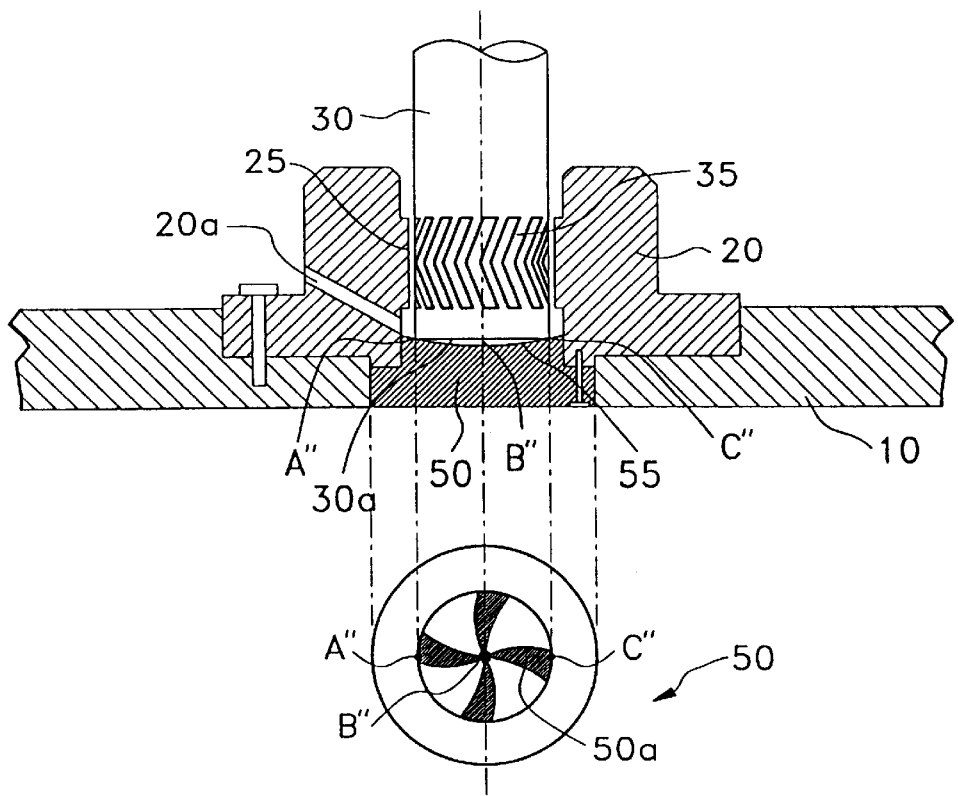
FIGS. 3A and 3B are sectional views illustrating a journal bearing apparatus and a graph indicating a distribution of fluid pressure applied to an end of the rotation shaft, according to another embodiment of the present invention.
Figure 3B:
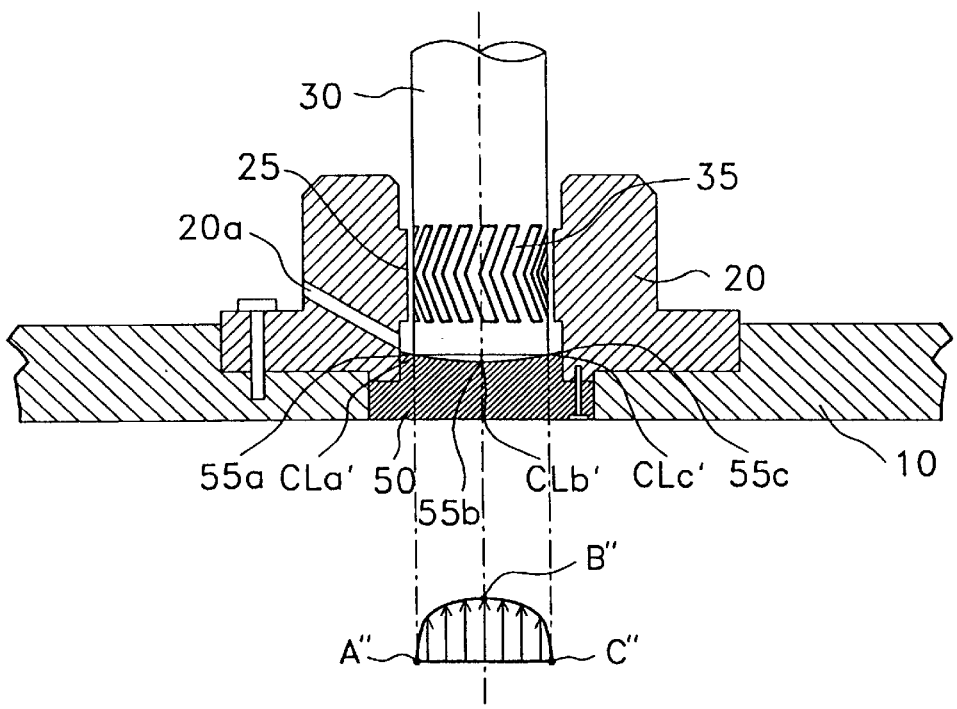

FIGS. 3A and 3B show a journal bearing apparatus according to another embodiment of the present invention. According to the other embodiment, as shown in FIGS. 3A and 3B, the clearance between the thrust bearing 50 and the end face 30a of the rotation shaft 30 continuously varies along the diametral direction of the second dynamic pressure generating groove 55. This clearance is wider in the central part than along the edges. Preferably, according to this embodiment, as the section of the thrust bearing 50 has a circular arc, the clearance continuously varies. In the case that the rotation shaft is rotated, the curvature of the circular arc is set so that the fluid pressure loaded into the diametral direction of the second dynamic pressure generating groove 55 is uniform.

The details of this second embodiment will be explained as follows.

First, edge parts of the second dynamic pressure generating groove 55 of the thrust bearing 50 are indicated as A" and C", and a central part is indicated as B". Parts of the bush 25 facing the edge parts A" and C" and the central part B" are indicated as 55a, 55c and 55b, respectively. Moreover, clearances between A" and 55a, B" and 55b, and C" and 55c are defined as CLa', CLb' and CLc', respectively.

In the case that CLa' and CLc' are zero (0), CLb' is 0<CLb'<1–10 μm. Accordingly, the relation among CLa', CLb' and CLc' is CLa', CLc'<CLb'<1–10 μm. Referring to FIGS. 3A and 3B, the section of the thrust bearing 50 is a circular arc passing through 55a, 55b and 55c. The curvature of the circular arc is decided by the CLb', if CLa' is equal to CLc'.

The fluid pressure loaded into the diametral direction of the second dynamic pressure generating groove 55 gradually varies along the circular arc of the thrust bearing 50. The fluid pressure is large in parts A" and C" where the clearance between the thrust bearing 50 and the end face 30a of the rotation shaft 30 is small. To the contrary, the fluid pressure is small in part B" where the clearance is large. However, as the fluids induced from A" and C" are gathered in B", the clearance according to the curvature of the circular arc is properly adjusted and thereby the fluid pressure in A", C" and B" is uniform. Referring to a graph of FIG. 3B, the pressure which is evenly distributed is shown.

The operation of the journal bearing apparatus in which the clearance between the thrust bearing and an end of the rotation shaft continuously varies is explained as follows.

First, when power is supplied to a rotor and stator (not illustrated) and the rotor starts to rotate, the plate 60 to which the rotor is attached, the hub 70 to which the plate 60 is fixed, the optical polygon 80 fixed to the hub 70, and the rotation shaft 30 to which the hub 70 is indentedly fixed are rotated at the same angular velocity.

At this time, the fluid between the thrust bearing 50 and the rotation shaft 30 is induced to a part B" of the second dynamic pressure generating groove 55 through parts A" and C" of the second dynamic pressure generating groove 55. The induced fluids are gathered in B" and a predetermined fluid pressure P is generated.

Here, the fluid pressure P is decided by the force F (kgf) which pushes the rotation shaft 30 by the axial weight and axial load, the clearance area S between the thrust bearing 50 and the end face 30a of the rotation shaft 30, and the rotational speed of the rotation shaft 30. As the force F which pushes the rotation shaft 30 is already determined, the fluid pressure P is actually determined by the clearance area S and the rotational speed of the rotation shaft 30. When the rotation shaft 30 starts to drive, the clearance area between the edge parts A" and C" of the thrust bearing 50 and the rotation shaft 30 is the smallest, and the fluid pressure is the largest. Subsequently, as the fluid is induced from A" to B", and from C" to B", the clearance area gradually increases, and the fluid pressure P gradually decreases. In result, the fluid pressure P on the thrust bearing 50 and the rotation shaft 30 becomes even, and the stability of the rotation shaft 30 increases.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A journal bearing apparatus, comprising:
    a rotation shaft having a first dynamic pressure generating groove formed at an outer surface along the circumferential direction thereof;
    a sleeve having a through hole formed therein in which said rotation shaft is inserted, and a bush which protrudes from a part of said sleeve facing said first dynamic pressure generating groove of said rotation shaft;
    a bearing bracket for fixing said sleeve; and
    a thrust bearing which faces an end of said rotation shaft, and has a second dynamic pressure generating groove to generate the fluid pressure for raising said rotation shaft, wherein, a clearance between said protruding bush and said first dynamic pressure generating groove continuously varies in the longitudinal direction of said first dynamic pressure generating groove.

2. The journal bearing apparatus of claim 1, wherein a plurality of said protruding bushes is formed.

3. The journal bearing apparatus of claim 1, wherein said clearance is wider at a central part thereof, than the edge parts.

4. The journal bearing apparatus of claim 3, wherein said protruding bush has an end in the shape of a circular arc.

5. The journal bearing apparatus of claim 4, wherein said circular arc has a curvature so that the fluid pressure loaded into the longitudinal direction of said first dynamic pressure generating groove is uniform, when said rotation shaft is rotated.

6. A journal bearing apparatus, comprising:
 a rotation shaft having a first dynamic pressure generating groove formed at an outer surface along the circumferential direction thereof;
 a sleeve having a through hole formed therein in which said rotation shaft is inserted, and a bush which protrudes from a part of said sleeve facing said first dynamic pressure generating groove of said rotation shaft;
 a bearing bracket for fixing said sleeve; and
 a thrust bearing which faces an end of said rotation shaft, and has a second dynamic pressure generating groove to generate the fluid pressure for raising said rotation shaft,
 wherein, a clearance between the end of said rotation shaft and the upper surface of said thrust bearing continuously varies in the diametral direction of said second dynamic pressure generating groove.

7. The journal bearing apparatus of claim 6, wherein said clearance is wider at a central part thereof than the edge parts.

8. The journal bearing apparatus of claim 7, wherein the upper surface of said thrust bearing has the shape of a circular arc.

9. The journal bearing apparatus of claim 8, wherein said circular arc has a curvature so that the fluid pressure loaded into the diametral direction of said second dynamic pressure generating groove is uniform, when said rotation shaft is rotated.

10. The journal bearing apparatus of claim 6, wherein said clearance between said rotation shaft of said first dynamic pressure generating groove and said protruding bush continuously varies in the longitudinal direction of said first dynamic pressure generating groove.

11. The journal bearing apparatus of claim 10, wherein said clearance is wider at a central part thereof than the edge parts.

* * * * *

UNITED STATES PATENT AND TRADEMARK OFFICE
CERTIFICATE OF CORRRECTION

PATENT NO. : 5,988,887
DATED : November 23, 1999
INVENTOR(S) : Chang-woo Lee It is certified that error appears in the above-identified patent and that said Letters Patent is hereby corrected as shown below:

On the title page, item [56]:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 5 | 0 | 4 | 6 | 3 | 7 | 4/96 | Asada et al. | 384 | 107 | |
| | | 5 | 0 | 4 | 6 | 8 | 6 | 3 | 9/91 | Sakatani et al | 384 | 115 | |
| | | 5 | 1 | 4 | 1 | 3 | 3 | 8 | 8/92 | Asada et al. | 384 | 114 | |

Signed and Sealed this

Thirteenth Day of June, 2000

Attest:

*Attesting Officer*

Q. TODD DICKINSON

*Director of Patents and Trademarks*